United States Patent
Irimajiri et al.

[11] 3,884,199
[45] May 20, 1975

[54] ENGINE VALVE OPERATING SYSTEM

[75] Inventors: Shoichiro Irimajiri, Kawagoe; Masayuki Kumada, Hanno, Japan

[73] Assignee: Honda Giken Kogyo Kabushiki Kaisha, Tokyo, Japan

[22] Filed: Nov. 29, 1973

[21] Appl. No.: 420,228

[30] Foreign Application Priority Data
Dec. 11, 1972  Japan .............................. 47-141214

[52] U.S. Cl. ......... 123/90.61; 123/90.22; 123/90.4; 123/90.48; 123/191 S; 123/191 SP
[51] Int. Cl. ............................................... F01l 1/14
[58] Field of Search .......... 123/191 S, 191 SP, 90.4, 123/90.22, 90.61, 90.48

[56] References Cited
UNITED STATES PATENTS

| | | | |
|---|---|---|---|
| 1,721,341 | 7/1929 | Halford | 123/90.61 |
| 2,065,419 | 12/1936 | Bagnulo | 123/191 SP |
| 2,713,855 | 7/1955 | Witzky | 123/90.4 |
| 2,884,913 | 5/1959 | Heintz | 123/191 SP |
| 2,925,808 | 2/1960 | Baumann | 123/90.61 |
| 2,975,775 | 3/1961 | Macura | 123/90.61 |
| 3,048,156 | 8/1962 | Van Slooten | 123/90.61 |
| 3,301,241 | 1/1967 | Iskenderian | 123/90.61 |

FOREIGN PATENTS OR APPLICATIONS

| | | | |
|---|---|---|---|
| 520,597 | 4/1940 | United Kingdom | 123/191 SP |
| 1,341,909 | 9/1963 | France | 123/191 S |

*Primary Examiner*—Manuel A. Antonakas
*Assistant Examiner*—Daniel J. O'Connor
*Attorney, Agent, or Firm*—Lyon & Lyon

[57] ABSTRACT

A valve operating system for engines of the type including a main combustion chamber having intake and exhaust valves, an auxiliary combustion chamber having an auxiliary intake valve, a spark plug, and a torch nozzle communicating with the main combustion chamber; the valve operating system including main and auxiliary rocker arms for actuating the main and auxiliary intake valves which are operated by a common upper tappet, a push rod and a lower tappet connected by ball and socket joints, the lower tappet being cam operated. A similar cam operated assembly, including a rocker arm, is provided to operate the exhaust valve.

5 Claims, 2 Drawing Figures

3,884,199

ENGINE VALVE OPERATING SYSTEM

BACKGROUND AND SUMMARY OF THE INVENTION

Internal combustion engines having a main combustion chamber and an auxiliary combustion chamber connected thereto through a torch nozzle require an auxiliary intake valve as well as a main intake valve and exhaust valve. Also preheating by the exhaust gases of the intake mixture to both the main and auxiliary combustion chambers is required. Intake and exhaust passages communicating with the intake and exhaust valves often open collectively at one side of the engine head and occupy such a large portion of the available area that the space needed for the valve operating means is severely limited.

The present invention is directed to a valve operating means which provides a solution to this problem and is summarized in the following objects:

First, to provide a valve operating system which incorporates a novel means wherein only two valve operating assemblies are needed for the three valves required in an internal combustion engine of the type having an auxiliary combustion chamber.

Second, to provide a valve operating system, as indicated in the previous object, wherein interconnected rocker arms for the main and auxiliary intake valves utilize a single cam operated push rod assembly to effect simultaneous operation of both intake valves.

Third, to provide a valve operating system, as indicated on the other objects, wherein each rocker arm operating assembly includes an upper tappet, a cam operated tappet and a connecting push rod, the ends of which are fitted into sockets provided in the tappets to form ball and socket joints permitting the upper tappets to be contiguous thereby to conserve space for passages in the engine head, whereas the cam operated tappets may have greater spacing to accomodate cylinders disposed in V-relation.

Figure 1:
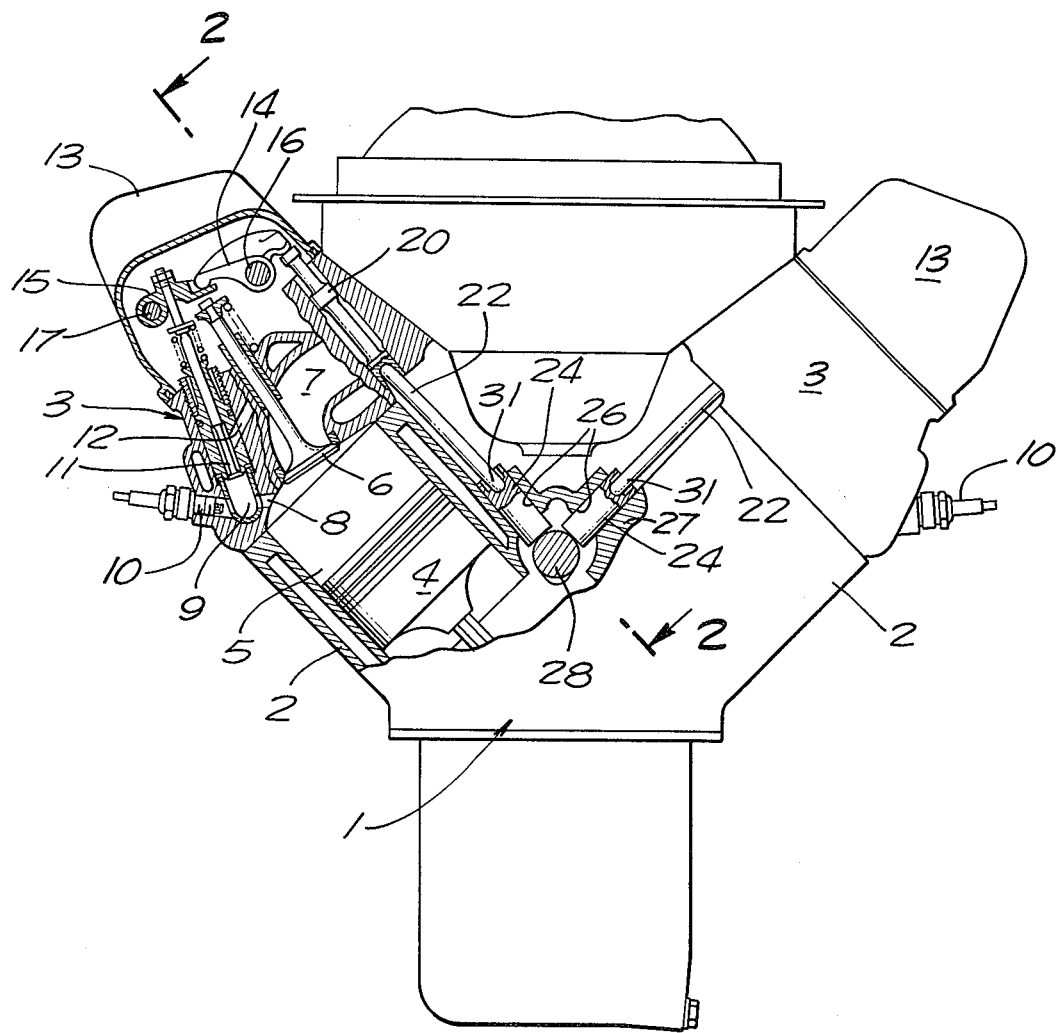
FIG. 1 is a partial end view, partial sectional view of an internal combustion engine provided with the valve operating system.

The valve operating system is shown as incorporated in a V-type engine including an engine block 1 having diverging sets of cylinders 2 and a head 3 capping each set of cylinders. Each cylinder receives a piston 4 and the head forms with the cylinder and piston a main combustion chamber 5. Each main combustion chamber is provided with a main intake valve 6 controlling a main intake passage 7 disposed within the head 3 and including a stem extending through the engine head 3.

Connected to each main combustion chamber 5 through a torch nozzle 8 is an auxiliary combustion chamber 9 having a spark plug 10. The auxiliary combustion chamber is provided with an auxiliary intake valve 11 controlling an auxiliary intake passage 12 disposed within the head 3 and including a stem extending through the engine head 3.

The main and auxiliary intake passages are connected to a suitable fuel supply system, not shown, and which does not form a part of the present invention.

The extended ends of the main and auxiliary valves are received in a housing 13 covering the engine head 3 and are provided with suitable springs so as to occupy a normally closed position. The main and auxiliary valves are engaged respectively by main and auxiliary rocker arms 14 and 15 mounted on shafts 16 and 17. The rocker arms are in interengaging relation so that movement of the rocker arm 14 to open the main intake valve 6 also opens the auxiliary intake valve 11.

An exhaust valve, not shown, is provided for each main combustion chamber 5, the exhaust valve is similar to the main intake valve 6 and is provided with a stem engaged by a rocker arm, not shown, similar to the rocker arm 14. The exhaust valve controls an exhaust passage 18 disposed within the head 3 and shown in FIG. 2. Prior to entering the head 3, the intake passages are brought into heat exchanging relation by means, not shown.

Figure 2:
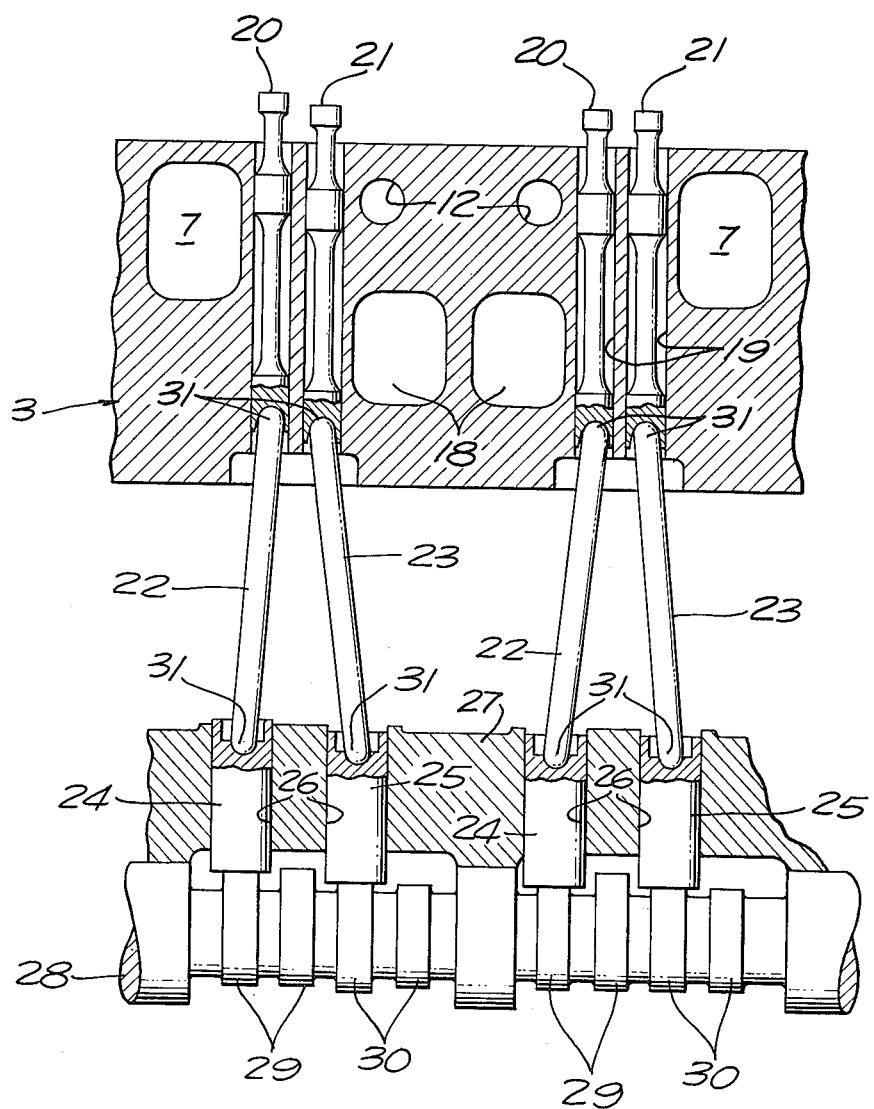
FIG. 2 is an enlarged fragmentary sectional view thereof showing particularly the valve operating system.

Disposed within the engine head 3, offset to one side of the cylinders 2, is a row of guide bores 19 as indicated in FIG. 2 arranged in pairs to receive pairs of upper tappets 20 and 21 for engaging the main intake rocker arms 14 and the corresponding exhaust valve rocker arms, not shown. The upper tappets are engaged respectively by push rods 22 and 23 which diverge slightly and engage corresponding lower tappets 24 and 25 slidable in bores 26 provided in a wall of a cam shaft housing 27. Journaled in the housing 27 is a cam shaft 28 having pairs of cams 29 and 30 which engage respectively the lower tappets 24 and 25. The upper tappets 20 and 21 as well as the lower tappets 24 and 25 are provided with sockets which journal the semispherical ends of the push rods, thus forming therewith ball and socket joints 31.

By reason of the connection between the rocker arms 14 and 15, only one operating assembly is required for both intake valves. Also the two assemblies required for intake and exhaust flow to and from each cylinder, may be placed in close relation to maximize the space available for the auxiliary passage 12, main intake passage 7 and exhaust passage 18, as indicated in FIG. 2. Due to the ball and socket type of connection between the push rods and the tappets, the push rods may diverge from the upper or rocker arm actuating tappets to the lower or cam actuated tappets permitting ample space to operate a pair of V-related cylinders.

Having fully described our invention it is to be understood that we are not to be limited to the details herein set forth, but that our invention is of the full scope of the appended claims.

We claim:

1. An engine having an engine head, a main combustion chamber and an auxiliary combustion chamber connected to the main combustion chamber through a torch nozzle; the chambers having respectively, a main and an auxiliary intake valve and the main chamber also having an exhaust valve; said engine comprising: intake and exhaust passages extending into one side of the engine head to communicate with the intake and exhaust valves; intake valve and exhaust valve actuating tappets slidably disposed in immediately adjacent parallel relation passing between said intake and exhaust passages in the engine head; actuating means operatively connecting the intake valve tappet to both of the intake valves; a cam shaft; a corresponding pair of cam actuated slidable tappets disposed in parallel relation adjacent the cam shaft; and means connecting the valve actuating tappets and cam actuated tappets.

2. A valve operating system, as defined in claim 1, wherein: said actuating means includes a main intake valve rocker arm and an auxiliary intake valve rocker arm, the rocker arms being mounted on separate shafts and mutually engageable to effect simultaneous operation of said main and auxiliary intake valves.

3. A valve operating system, as defined in claim 1, wherein: the connecting means between the tappets are push rods and form with the tappets ball and socket joints permitting the cam operated tappets to have greater spacing than the valve actuating tappets.

4. An engine having V-related pairs of coplanar cylinders, each cylinder having a main combustion chamber, and an auxiliary combustion chamber connected to the main combustion chamber through a torch nozzle, the chambers having, respectively, a main and an auxiliary intake valve, the main chamber also having an exhaust valve, the engine having engine heads, said engine comprising: intake and exhaust passages extending into one side of each engine head to communicate with the intake and exhaust valves; intake valve and exhaust valve actuating tappets for each cylinder sidably disposed in immediately adjacent parallel relation clearing the intake and exhaust passages in the engine heads; actuating means operatively connecting the intake valve tappet to both of the intake valves; a cam shaft common to each pair of cylinders; a pair of cam actuated slidable tappets for the valve actuating tappets of each cylinder disposed in parallel relation adjacent the cam shaft, at least one of said pair of cam actuated slidable tappets being laterally displaced from the centerline of the corresponding valve actuating tappet; and pushrods connecting the valve actuating tappets and cam actuated tappets to each cylinder.

5. An engine comprising: an engine head; a coombustion chamber; intake and exhaust valves associated with said combustion chamber; intake and exhaust passages extending into one side of said engine head to communicate with said intake and said exhaust valves; intake valve and exhaust valve actuating tappets slidably disposed in immediately adjacent parallel relationship between the intake and exhaust passages in the engine head; actuating means operably connecting said valve tappets to said valves; a cam shaft; a corresponding pair of cam actuated slidable tappets disposed in parallel relation adjacent the cam shaft and push rods disposed in unparallel relation connecting the valve actuating tappets and cam actuated tappets.

* * * * *